United States Patent
Shah et al.

(10) Patent No.: US 10,473,507 B2
(45) Date of Patent: Nov. 12, 2019

(54) E-11 SWITCH ASSEMBLY

(71) Applicant: Fluid Handling LLC, Morton Grove, IL (US)

(72) Inventors: Pratik Shah, Des Plaines, IL (US); Ronan Stephens, Chicago, IL (US); James J. Gu, Buffalo Grove, IL (US)

(73) Assignee: Fluid Handling LLC, Morton Grove, IL (US)

( * ) Notice: Subject to any disclaimer, the term of this patent is extended or adjusted under 35 U.S.C. 154(b) by 0 days.

(21) Appl. No.: 15/581,437

(22) Filed: Apr. 28, 2017

(65) Prior Publication Data
US 2017/0314982 A1    Nov. 2, 2017

Related U.S. Application Data

(60) Provisional application No. 62/328,684, filed on Apr. 28, 2016.

(51) Int. Cl.
| | |
|---|---|
| *G01F 23/22* | (2006.01) |
| *G01F 23/00* | (2006.01) |
| *G05B 9/02* | (2006.01) |
| *G08B 5/36* | (2006.01) |
| *F24H 9/20* | (2006.01) |

(52) U.S. Cl.
CPC .......... *G01F 23/22* (2013.01); *F24H 9/2007* (2013.01); *G01F 23/0061* (2013.01); *G05B 9/02* (2013.01); *G08B 5/36* (2013.01); *F24D 2220/048* (2013.01)

(58) Field of Classification Search
None
See application file for complete search history.

(56) References Cited

U.S. PATENT DOCUMENTS

| | | | | |
|---|---|---|---|---|
| 3,329,779 A | * | 7/1967 | Clark, Jr. | .................. G04F 3/00 |
| | | | | 200/37 R |
| 3,342,136 A | * | 9/1967 | Domecki | ................ E03B 5/045 |
| | | | | 137/206 |
| 3,739,334 A | * | 6/1973 | Hocking | .................. G08B 5/36 |
| | | | | 307/38 |

(Continued)

FOREIGN PATENT DOCUMENTS

| | | |
|---|---|---|
| JP | 05187689 A | 7/1993 |
| WO | 2005056154 | 6/2005 |

OTHER PUBLICATIONS

English language abstract of JPH05187689A.
McDonnell & Miller, Installation & Maintenance Instructions for No. 11, 11M and 11MV, © 2007 ITT Corporation.

*Primary Examiner* — Curtis J King
(74) *Attorney, Agent, or Firm* — Ware, Fressola, Maguire & Barber LLP

(57) ABSTRACT

A switch assembly includes an automatic type 11 switch having 1 and 2 contacts and 3 and 4 contacts with the 2 and 3 contacts being shorted together, configured to respond to a water level of a boiler, short the 1 and 2 contacts when the water level is high, short the 3 and 4 contacts when the water level is low; and an electronic circuit board having a processor configured to sense signaling containing information about the 1, 2/3 and 4 contacts, and provide control signaling containing information about the water level of the boiler. The electronic circuit board also includes a relay configured to respond to the control signaling, and turn the relay on/off.

18 Claims, 2 Drawing Sheets

(56) References Cited

U.S. PATENT DOCUMENTS

| | | | |
|---|---|---|---|
| 3,831,429 A | 8/1974 | Kmiecik | |
| 3,834,357 A | 9/1974 | Kaczmarek et al. | |
| 3,986,372 A | 10/1976 | Karklys | |
| 4,263,587 A | 4/1981 | John | |
| 4,560,323 A | 12/1985 | Orchard | |
| 4,742,244 A | 5/1988 | Koerner | |
| 4,798,669 A * | 1/1989 | Bachhofer | C02F 1/78 210/109 |
| 4,888,702 A * | 12/1989 | Gerken | H02J 7/35 700/295 |
| 4,889,132 A * | 12/1989 | Hutcheson | A61B 5/02208 600/493 |
| 5,281,309 A | 1/1994 | Greene | |
| 5,283,552 A * | 2/1994 | Sol | G01M 3/2815 340/605 |
| 5,546,002 A * | 8/1996 | Hickl | H01H 47/002 324/415 |
| 5,600,997 A | 2/1997 | Kemp et al. | |
| 5,729,206 A * | 3/1998 | Divens | G01F 23/0023 340/618 |
| 5,956,280 A * | 9/1999 | Lawrence | G01R 31/31908 324/73.1 |
| 6,926,028 B2 | 8/2005 | Murray et al. | |
| 7,271,714 B2 * | 9/2007 | Beaujard | G01R 31/024 340/514 |
| 7,639,907 B2 | 12/2009 | Elberbaum | |
| 7,649,727 B2 | 1/2010 | Elberbaum | |
| 8,269,376 B1 | 9/2012 | Elberbaum | |
| 8,331,794 B2 | 12/2012 | Elberbaum | |
| 8,384,249 B2 | 2/2013 | Elberbaum | |
| 8,638,087 B2 | 1/2014 | Elberbaum | |
| 9,018,803 B1 | 4/2015 | Elberbaum | |
| 9,036,320 B1 | 5/2015 | Elberbaum | |
| 9,054,465 B2 | 6/2015 | Hodges | |
| 9,153,970 B2 | 10/2015 | Scripca et al. | |
| 9,219,358 B2 | 12/2015 | Elberbaum | |
| 9,281,147 B2 | 3/2016 | Elberbaum | |
| 2001/0049265 A1 * | 12/2001 | Nakao | H03K 17/687 455/73 |
| 2003/0030582 A1 * | 2/2003 | Vickers | G01S 17/023 342/54 |
| 2003/0052780 A1 * | 3/2003 | Buckley | G08B 13/08 340/547 |
| 2003/0090374 A1 * | 5/2003 | Quigley | G08B 19/005 340/506 |
| 2004/0181349 A1 | 9/2004 | Tynkov | |
| 2005/0270137 A1 * | 12/2005 | Yarbrough, III | H01P 1/127 340/2.28 |
| 2010/0132803 A1 | 6/2010 | Fima | |
| 2012/0197555 A1 | 8/2012 | Cheng et al. | |
| 2013/0242854 A1 * | 9/2013 | Cai | H04L 1/0003 370/315 |
| 2015/0012145 A1 | 1/2015 | Kiko | |
| 2016/0286613 A1 * | 9/2016 | Bayat | H05B 33/0818 |

* cited by examiner

No. 11M Switch (Prior Art)

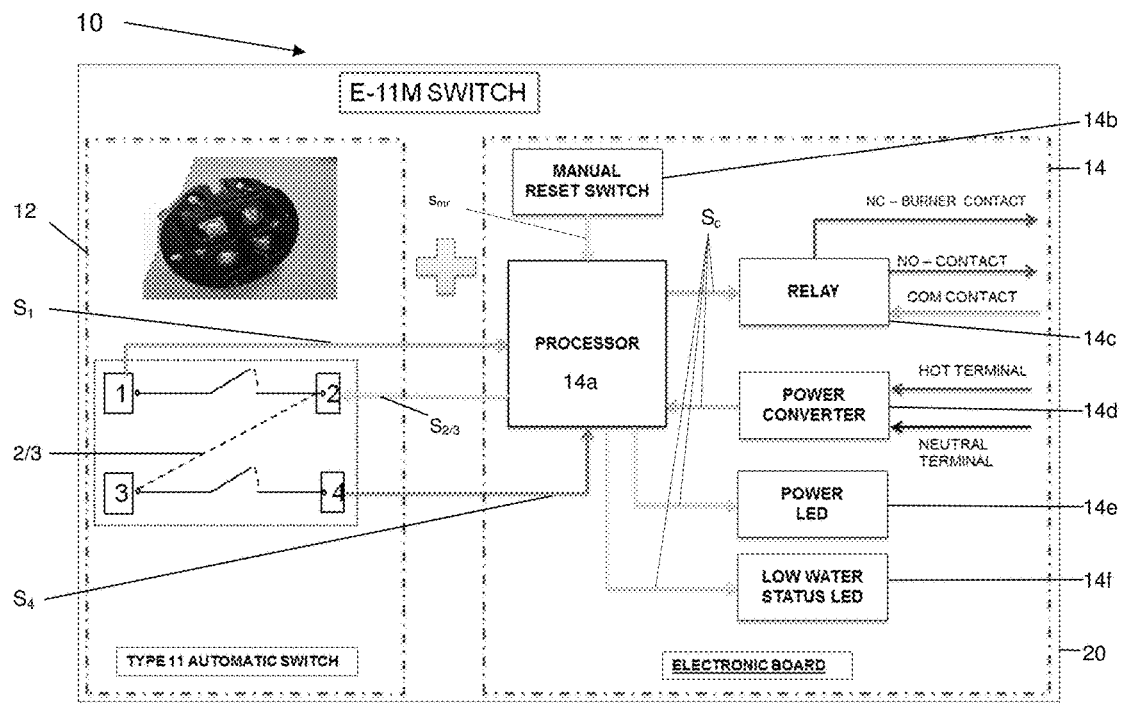
Figure 2: E-11M System Block Diagram
Figure 3: E-11M FUNCTIONALITY TABLE

E-11 SWITCH ASSEMBLY

CROSS-REFERENCE TO RELATED APPLICATION

This application claims benefit to provisional patent application Ser. No. 62/328,684, filed 28 Apr. 2016, which is hereby incorporated by reference in its entirety.

BACKGROUND OF THE INVENTION

1. Field of the Invention

The present invention relates to a switch; and more particularly to a switch for providing a mechanical low water cut-off (LWCO), e.g., for a burner or other hot water/liquid heating device.

2. Brief Description of Related Art

A current No. 11M known in the art has a single pole double throw (SPDT) switch with a latching mechanism used in a mechanical LWCO implementation. At normal water level, a circuit through terminal "1" is closed. It latches open in a low water condition. Depressing the manual reset button unlatches the mechanism after normal water level has been restored to the control.

This method of operation meets the requirements of the American Society of Mechanical Engineers (ASME) Standard CSD-1, wherein if a LWCO is in a low water condition when there is an interruption of power, the LWCO will remain in a low water condition when power is restored. The reset button integrated on the 11M switch needs to be pressed when the water level is restored in order to close the circuit. By way of example, see that set forth in ASME CSD-1 (2009): Controls and Safety Devices for Automatically Fired Boilers.

The current no. 11M switch is manufactured at a low quantity, is very labor intensive to manufacture, has a low production yield rate, and consequently has a high cost to manufacture.

The assignee of the present invention also produces a No. 11 switch that contains two (2) single pole single throw (SPST) switches to control a water feeder and the low water cut-off. In operation, the low water cut-off switch control opens and closes based on water level. The water feeder switch control works opposite to the LWCO control. This is an automatic switch and therefore is not ASME CSD-1 compliant. See McDonnell & Miller, Installation & Maintenance Instructions for No. 11, 11M and 11MV, ©2007 ITT Corporation, which is incorporated by reference herein.

By way of example, FIG. 1 shows the assignee's No. 11M switch having the SPDT switch with an associated latching mechanism used in a mechanical LWCO implementation. The assignee's No. 11M switch has 4 terminals, e.g., labeled "1", "2", "3" and "4". Terminal "2" is a common terminal. At normal water level, a circuit through terminal "1" is closed. It latches open in a low water condition. Depressing the manual reset button unlatches the mechanism after normal water level has been restored to the control. Terminal "4" provides a contact only for an alarm at low water and is not intended for use with an electric feeder, e.g., for providing water in response to the low water condition.

The assignee's No. 11M switch is manufactured at high quantities and consequently at a more favorable cost. In spite of this, one problem is how to provide the functionality of the No. 11M switch by converting or adapting the No. 11M switch for it is ASME CSD-1 compliant, without altering the design of the No. 11M switch and keeping same basic No. 11M switching functionality.

SUMMARY OF THE INVENTION

In summary, the present invention provides a new and unique version of a No. 11M switch, hereinafter known as the "E-11M switch or switch assembly," which shall be backward compatible with the current No. 11M switch, and also have the advantage of providing the option to the marketplace of converting an automatic LWCO (using a No. 11M switch) to a CSD-1 complaint LWCO by adding the E-11M components.

In effect, the new E-11M switch assembly according to the present invention is a combination of an automatic 11 type mechanical switch and an electronic board. The new E-11M switch assembly may also include a visual indication for power and low water control status.

By way of example, and according to some embodiments, the present invention may include, or take the form of, a switch assembly featuring a new and unique combination of an automatic type 11 switch and an electronic circuit board.

The automatic type 11 switch may include contacts and be configured to respond to a water level of a liquid heating device. The contacts may include a first pair of contacts configured to short when the water level is high, and a second pair of contacts configured to short when the water level is low. In addition, a contact from the first pair of contacts and a corresponding contact from the second pair of contacts may be configured to short together.

The electronic circuit board may include a processor configured to receive signaling containing information about the first pair of contacts and the second pair of contacts, and provide control signaling containing information about the liquid level of the liquid heating device.

The switch assembly may also include one or more of the following features:

The first pair of contacts and the second pair of contacts may include different pairs of contacts.

The contacts may include four contacts, including contacts "1", "2", "3" and "4"; the first pair of contacts may include contacts "1" and "2"; the second pair of contacts may include contacts "3" and "4"; and contact "2" from the first pair of contacts and corresponding contact "3" from the second pair of contacts may be configured to short together.

The automatic type 11 switch may be configured to short the contacts "1" and "2" when the liquid level is sufficient in liquid heating device.

The automatic type 11 switch may be configured to short the contacts "3" and "4" when the liquid level is low in the liquid heating device.

The automatic type 11 switch may be configured to short the contacts "1" and "2" and the contacts "3" and "4" for a small duration until a liquid feeder is feeding liquid to the liquid heating device, e.g., when the liquid level is low.

The electronic circuit board may be configured to couple or connect to contacts "1", "2" and "4" and sense if either the first pair of contacts is shorted or the second pair of contacts is shorted, and determine the liquid level of the liquid heating device based upon the same, including where the processor is configured to provide interrogation signaling to contact "2" and receive corresponding signaling back from either contact "1" or "4".

The electronic circuit board may include some combination of a reset switch, a relay, a power converter, and one or more LEDs for providing one or more status indications.

In operation, the relay may be configured to respond to the control signaling, and turn the relay on/off and/or provide a NC-burner contact signal. The relay may also be configured to respond to a com contact signal, and provide a no-contact relay signal.

The one or more LEDs may include a power LED. In operation, the processor may be configured to provide power LED control signaling to turn on the power LED as soon as the switch assembly gets initialized.

The one or more LEDs may also include a low water status LED. In operation, the processor may be configured to provide low water status LED control signaling to turn on the low water status LED when the boiler water level is low.

The reset switch may be configured to be reset be a user, and provide a reset switch signal containing information that the manual reset switch is reset. In operation, the processor may be configured to respond to the reset switch signal, and provide the LED control signaling for turning the low water status LED off when the liquid level has risen.

By way of further example, and according to some embodiments, the present invention may take the form of a switching assembly, where the automatic type 11 switch may include contacts "1" and "2" and contacts "3" and "4" with the contacts "2" and "3" being shorted together, may be configured to respond to a water level of a boiler, short the contacts "1" and "2" when the water level is high, short the contacts "3" and "4" when the water level is low; and where the electronic circuit board may include a processor configured to sense signaling containing information about the contacts "1", "2/3" (i.e., "shorted" together) and "4", and provide control signaling containing information about the water level of the boiler. This embodiment may also include one or more of the features set forth above.

By way of still further example, and according to some embodiments, the present invention may take the form of a method, featuring steps for:
- configuring an automatic type 11 switch with contacts "1" and "2" and contacts "3" and "4" with the contacts "2" and "3" being shorted, and also configuring the automatic type 11 switch to respond to a water level of a boiler, and either short the contacts "1" and "2" when the water level is high, or short the contacts "3" and "4" when the water level is low; and
- configuring an electronic circuit board with a processor to sense signaling containing information about the contacts "1", "2/3" and "4", and provide control signaling containing information about the water level of the boiler.

The method may also include one or more steps for implementing one or more of the other features disclosed herein.

BRIEF DESCRIPTION OF THE DRAWING

The drawing includes the following Figures, not necessarily drawn to scale, including:

FIG. 1 includes FIGS. 1A and 1B, where

FIG. 2 is a system block diagram of a new E-11M switch assembly, according to some embodiments of the present invention.

FIG. 3 is a diagram of a functionality table for the E-11 switch assembly shown in FIG. 1, according to some embodiments of the present invention.

In the Figures, similar parts are labeled with similar reference numerals. Moreover, not every part is labelled with a reference numeral and lead line in every Figure, so as to reduce clutter in the drawing.

DETAILED DESCRIPTION OF THE INVENTION

FIG. 2

Figure 1A:
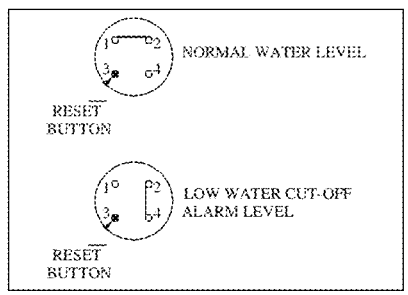
FIG. 1A shows a diagram of a No. 11M switch having contacts/terminals "1" and "2" coupled in a normal water level having contacts/terminals "2" and "4" coupled in a low water cut-off alarm level, and having a reset button; and where
Figure 1B:
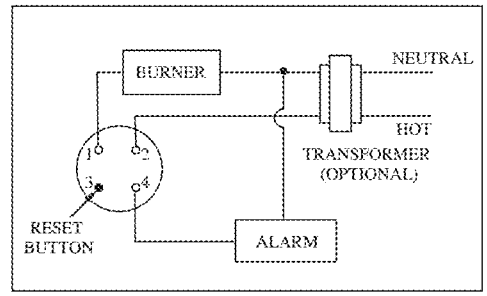
FIG. 1B shows a diagram of the No. 11M switch having contacts/terminals "1" thru "4" coupled to a burner, an alarm and a transformer (optional) having neutral and hot lines.

FIG. 2 shows a switch assembly generally indicated as 10, e.g., featuring a new and unique combination of an automatic type 11 switch 12 and an electronic circuit board 14.

The automatic type 11 switch 12 may include a first pair of contacts "1" and "2" and a second pair of contacts "3" and "4" (labeled accordingly as shown) with the contacts "2" and "3" being shorted together, e.g., by a lead line labeled "2/3", configured to respond to a water level of a boiler, short the first pair of contacts "1" and "2" when the water level is high, short the 3 and 4 contacts when the water level is low.

The electronic circuit board 14 may include a processor 14a configured to sense signaling containing information about the contacts "1", "2/3" (i.e., shorted together) and "4", and provide control signaling $S_c$ containing information about the water level of the boiler. By way of example, and consistent with that set forth below, the control signaling $S_c$ may control the operation of one or more components 14b, 14c, 14d, 14e, 14f in the electronic board 14.

It is note for the sake of completeness that the terms "contact" and "terminal" are used interchangeably.

Type 11 Automatic Switch 12

By way of further example, the type 11 automatic switch 12 includes automatic type 11 switch contacts "1" thru "4" that will be controlled through boiler water level. In FIG. 2, contacts/terminals "2" and "3" are coupled, connected or shorted together as shown. In operation, the type 11 automatic switch 12 will switch its contacts depending on the water level. For example, when the boiler is high or has sufficient water, the type 11 automatic switch 12 will short its "1" and "2" contacts. When the water level is low, the type 11 automatic switch 12 will short its "3" and "4" contacts. When the water is switching from an inwater to an outwater condition, both contacts "1" and "2" are short and contacts "3" and "4" are short, e.g. for a small duration, till a water feeder is feeding water to the boiler. The electronic board 14 connected to switch contacts "1", "2", and "4" will sense this terminal configuration (e.g., shorted or not shorted) and determine the water level, e.g., in the boiler, based upon the same.

Electronic Board 14

The electronic board 14 consists of, or may be configured with, a processor 14a, a reset switch 14b, a on/off relay 14c, a power converter 14d and LEDs for providing one or more status indications, e.g., including a power LED 14e for providing a power on/off LED indication and a low water status LED 14f for providing a low water status LED indication. Depending on automatic 11 switch contacts status, the processor 14a will sense the contacts, take an appropriate decision by tuning on/off the relay 14c and by turning on/off the LEDs 14e, 14f. In FIG. 2, two LEDs 14e, 14f are used for power and low water control status. The power LED 14e will be turn ON as soon as switch assembly 10 gets initialized. The low water status LED 14f will be turn ON when the water level is low, e.g., in the boiler. The LED 14f will remained ON unless the reset switch 14b is pressed to meet CSD-1 compliance, e.g., even if the water level has risen. By way of example, when the user presses the manual reset switch 14b, the manual reset switch 14b provides signal $s_{mr}$ to the processor 14a indicating to the processor that the user reset the manual reset switch 14b. A dry contact gives flexibility to installer/user for different power and Boiler potentials.

Reference labels $S_1$, $S_{2/3}$, $S_4$ indicate the signaling exchange between the processor 14a and the contacts/terminals "1" thru "4". By way of example, and consistent with that shown in FIG. 2, signaling $S_1$ and $S_4$ may be received from contacts "1" and "4" respectively. In comparison, signaling $S_{2/3}$ may be provided from the processor 14a to contact "2", e.g., as interrogation signaling to determine the water level. By way of example, if the processor 14a provides the interrogation signaling $S_{2/3}$ to contact "2" and receives suitable signaling $S_1$, then the processor 14a may determine that the boiler has sufficient water since contacts "1" and "2" are shorted. Alternatively, and by way of further example, if the processor 14a provides the interrogation signaling to contact "2" and receives suitable signaling $S_4$, then the processor may determine that the water level is low since contacts "3" and "4" are shorted.

By way of still further example, the type 11 automatic switch 12 and the electronic board 14 may be packed inside a mechanical enclosure generally indicated as 20 which can be retrofit to existing system low water controllers.

Such a combination according to the present invention has multiple benefits over the mechanical reset switch, e.g., including one or more of the following:
A. To overcome undesirable manufacturing or assembly issues;
B. To reduce the overall switch cost;
C. To enable a retrofit to existing mechanical low water controls;
D. To provide a power LED indication;
E. To provide a low water status LED indication; and
F. To provide dry contacts.

FIG. 3

FIG. 3 shows a functionality table setting forth the functionality related to the operation of the E-11M switch assembly.

The functionality table includes rows labeled Functional and CSD compliance.

The functionality table includes columns of testing function(s), e.g., including Power, Water condition, automatic 11 switch (e.g., 1&2, 3&4), manual reset button, relay contacts (e.g., burner no-contacts and alarm NC-contact), and LED status (e.g., red LED and Green LED).

The functional row includes two sets of functional conditions for the testing functions, as follows:
The first set of functional conditions includes: the power (on), the water condition (inwater), the automatic 11 switch (1&2 (short)), the automatic 11 switch (3&4 (open)), manual reset button (off), the relay contacts (burner no-contacts (close)), the relay contacts (alarm no-contact (open)), LED status (Red LED (blinks till Delay on Make (DOM) and off)), and LED status (Green LED (on)).

The second set of functional conditions includes: the power (on), the water condition (outwater), the automatic 11 switch (1&2 (open)), the automatic 11 switch (3&4 (short)), manual reset button (off), the relay contacts (burner no-contacts (open)), the relay contacts (alarm no-contact (close)), LED status (Red LED (blinks till DOB and on)), and LED status (Green LED (on)).

The CSD compliance row includes three sets of CSD compliance conditions for the testing functions, as follows:
The first set of CSD compliance conditions includes: the power (off), the water condition (outwater), the automatic 11 switch (1&2 (open)), the automatic 11 switch (3&4 (short)), manual reset button (off), the relay contacts (burner no-contacts (open)), the relay contacts (alarm no-contact (close)), LED status (Red LED (off)), and LED status (Green LED (off)).

The second set of CSD compliance conditions includes: the power (on), the water condition (inwater), the automatic 11 switch (1&2 (short)), the automatic 11 switch (3&4 (open)), manual reset button (off), the relay contacts (burner no-contacts (open)), the relay contacts (alarm no-contact (close)), LED status (Red LED (on)), and LED status (Green LED (on)).

The third set of CSD compliance conditions includes: the power (on), the water condition (inwater), the automatic 11 switch (1&2 (short)), the automatic 11 switch (3&4 (open)), manual reset button (on and upon release), the relay contacts (burner no-contacts (close)), the relay contacts (alarm no-contacts (open)), LED status (Red LED (blink LED 4 times and blink until DOM and OFF)), and LED status (Green LED (blink LED 4 times)).

The Processor 14a

By way of example, the functionality of the processor 14a may be implemented using hardware, software, firmware, or a combination thereof. In a typical software implementation, the processor 14a would include one or more microprocessor-based architectures having, e. g., at least one signal processor or microprocessor. A person skilled in the art would be able to program such a microcontroller (or microprocessor)-based implementation to perform the functionality described herein without undue experimentation. The scope of the invention is not intended to be limited to any particular implementation using technology either now known or later developed in the future. The scope of the invention is intended to include implementing the functionality of the processor 14a as stand-alone processor or processor module, as separate processor or processor modules, as well as some combination thereof.

The processor 14a may also include other signal processor circuits or components, e.g. including random access memory (RAM) and/or read only memory (ROM), input/output devices and control, and data and address buses connecting the same, and/or at least one input processor and at least one output processor.

The Other Components in the Electronic Board 14

The other components in the electronics board 14 are known in the art, including the manual switch 14b, the relay 14c, the power converter 14d, the LEDs 14e, 14f for indicating the power and lower water status. The scope of the invention is not intended to be limited to any particular type or kind of such components. Moreover, one skilled in the art would be able to implement the underlying functionality without undue experimentation, e.g., consistent with that disclosed herein.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

What we claim is:

1. A switch assembly comprising:
    an automatic type 11 switch having contacts and configured to respond to a water level of a water heating device, the contacts having a first pair of contacts configured to short when the water level is high, the contacts having a second pair of contacts configured to short when the water level is low, a contact from the first pair of contacts and a corresponding contact from the second pair of contacts configured to short together; and
    an electronic circuit board having a processor configured to receive signaling containing information about the first pair of contacts and the second pair of contacts, and provide control signaling containing information about the water level of the water heating device;
    the contacts comprising four contacts, including contacts "1", "2", "3" and "4",
    the first pair of contacts comprising contacts "1" and "2",
    the second pair of contacts comprising contacts "3" and "4", and
    contact "2" from the first pair of contacts and corresponding contact "3" from the second pair of contacts are configured to short together;
    wherein the electronic circuit board is configured to couple or connect to contacts "1", "2" and "4" and sense if either the first pair of contacts is shorted or the second pair of contacts is shorted, and determine water level the of the water heating device, including where the processor is configured to provide interrogation signaling to contact "2" and receive corresponding signaling back from either contact "1" or "4".

2. The switch assembly according to claim 1, wherein the electronic circuit board comprises some combination of a reset switch, a relay, a power converter, and one or more LEDs for providing one or more status indications.

3. The switch assembly according to claim 2, wherein the relay is configured to respond to the control signaling, and turn the relay on/off and/or provide a NC-burner contact relay signal.

4. The switch assembly according to claim 3, wherein the relay is also configured to respond to a com contact signal, and provide a no-contact relay signal.

5. The switch assembly according to claim 2, wherein the one or more LEDs comprises a power LED; and
    the processor is configured to provide power LED control signaling to turn on the power LED as soon as the switch assembly gets initialized.

6. The switch assembly according to claim 2, wherein
    the one or more LEDs comprises a low water status LED; and
    the processor is configured to provide low water status LED control signaling to turn on the low water status LED when the boiler water level is low.

7. The switch assembly according to claim 2, wherein the reset switch is configured to be reset by a user, and provide a reset switch signal containing information that the manual reset switch is reset.

8. The switch assembly according to claim 7, wherein the processor is configured to respond to the reset switch signal, and provide the LED control signaling for turning the low water status LED off when the water level has risen.

9. The switch assembly according to claim 1, wherein the automatic type 11 switch is configured to short the contacts "1" and "2" and the contacts "3" and "4" for a small duration until a liquid feeder is feeding liquid to the liquid heating device.

10. A switch assembly for determining a liquid level of a liquid heating device, comprising:
    a single pole double throw (SPDT) switch having four contacts "1", "2", "3" and "4", a first pair of contacts having contacts "1" and "2", a second pair of contacts having contacts "3" and "4", and contact "2" being shorted together with contact "3", the SPDT switch configured to receive interrogation signaling and provide SPDT switch signaling containing information about either a shorting of the first pair of contacts when a high liquid level is sensed, or a corresponding shorting of the second pair of contacts when a low liquid level is sensed; and
    an electronic circuit board having a processor configured to couple to the contacts "1", "2/3" and "4", provide the interrogation signaling, receive the SPDT switch signaling, and provide control signaling containing information about the liquid level of the liquid heating device, based upon the SPDT switch signaling received.

11. The switch assembly according to claim 10, wherein the electronic circuit board comprises a relay configured to respond to the control signaling, and turn the relay on/off.

12. The switch assembly according to claim 11, wherein the relay is also configured to respond to a com contact signal, and provide a no-contact relay signal and a NC-burner contact relay signal.

13. The switch assembly according to claim wherein
    the electronic circuit board comprises a power LED; and
    the processor is configured to provide power LED control signaling to turn on the power LED as soon as the switch assembly gets initialized.

14. The switch assembly according to claim wherein
    the electronic circuit board comprises a low water status LED; and
    the processor is configured to provide low water status LED control signaling to turn on the low water status LED when the boiler water level is low.

15. The switch assembly according to claim 10, wherein the electronic circuit board comprises a manual reset switch, configured to be reset be a user, and provide a manual reset switch signal containing information that the manual reset switch is reset.

16. The switch assembly according to claim 15, wherein the processor is configured to respond to the manual reset switch signal, and provide the LED control signaling for turning the low water status LED off when the boiler water level has risen.

17. The switch assembly according to claim 10, wherein the SPDT switch is configured to short the 1 and 2 contacts and the 3 and 4 contacts for a small duration until a water feeder is feeding water to the boiler.

18. A method for determining a liquid level of the liquid heating device, comprising:

configuring a single pole double throw (SPDT) switch having four contacts "1", "2", "3" and "4", a first pair of contacts having contacts "1" and "2", a second pair of contacts having contacts "3" and "4", and contact "2" being shorted together with contact "3", to receive interrogation signaling and provide SPDT switch signaling containing information about either a shorting of the first pair of contacts when a high water level is sensed, or a corresponding shorting of the second pair of contacts when a low water level is sensed; and configuring an electronic circuit board having a processor to couple to the contacts "1", "2/3" and "4", provide the interrogation signaling, receive the SPDT switch signaling, and provide control signaling containing information about the liquid level of the liquid heating device, based upon the SPDT switch signaling received.

* * * * *

UNITED STATES PATENT AND TRADEMARK OFFICE
CERTIFICATE OF CORRECTION

PATENT NO. : 10,473,507 B2
APPLICATION NO. : 15/581437
DATED : November 12, 2019
INVENTOR(S) : Pratik Shah, Ronan Stephens and James J. Gu Page 1 of 1

It is certified that error appears in the above-identified patent and that said Letters Patent is hereby corrected as shown below:

In the Claims

In Column 8, Line 47, Claim 13, after "claim" -- 10 -- should be inserted.

In Column 8, Line 52, Claim 14, after "claim" -- 10 -- should be inserted.

Signed and Sealed this
Twelfth Day of January, 2021

Andrei Iancu
*Director of the United States Patent and Trademark Office*